(12) United States Patent
Jouwsma et al.

(10) Patent No.: US 7,685,888 B2
(45) Date of Patent: Mar. 30, 2010

(54) CORIOLIS MEASURING SYSTEM WITH AT LEAST THREE SENSORS

(75) Inventors: Wybren Jouwsma, Lochem (NL); Aditya Mehendale, Ruurlo (NL)

(73) Assignee: Berkin B.V., Ruurlo (NL)

( * ) Notice: Subject to any disclaimer, the term of this patent is extended or adjusted under 35 U.S.C. 154(b) by 0 days.

(21) Appl. No.: 12/205,066

(22) Filed: Sep. 5, 2008

(65) Prior Publication Data
US 2009/0064797 A1    Mar. 12, 2009

(30) Foreign Application Priority Data
Sep. 10, 2007 (NL) .................................. 1034360

(51) Int. Cl.
*G01F 1/84* (2006.01)
(52) U.S. Cl. ................................ 73/861.355
(58) Field of Classification Search ............ 73/861.357, 73/861.355, 861.356, 504.13, 504.02, 61.44, 73/61.45; 702/25
See application file for complete search history.

(56) References Cited

U.S. PATENT DOCUMENTS 6,705,172 B1 * 3/2004 Deppe et al. ............ 73/861.355
7,152,460 B2 * 12/2006 Gysling et al. .............. 73/32 A
2007/0027638 A1 * 2/2007 Fernald et al. ................ 702/25

FOREIGN PATENT DOCUMENTS

EP        1 719 982 A1      11/2006

* cited by examiner

*Primary Examiner*—Jewel Thompson
(74) *Attorney, Agent, or Firm*—Young & Thompson

(57) ABSTRACT

A flow measuring system of the Coriolis type for measuring a mass flow, with a flow tube and with excitation elements for causing the flow tube to rotate about an axis of rotation, with at least three sensors arranged free of the flow tube for generating analog signals that correspond to the movement of the tube, and with elements for digitizing the analog signals and for computing the mass flow from the digitized sensor signals. The computation elements are arranged for using exclusively the time information from the sensor signals. The accurate time information of the sensors is used by algorithms in digital electronic circuits for accurately determining the ratio between amplitudes due to excitation and those due to Coriolis forces. The mass flow is derived from this ratio.

12 Claims, 2 Drawing Sheets

CORIOLIS MEASURING SYSTEM WITH AT LEAST THREE SENSORS

The invention relates to a measuring system of the Coriolis type for measuring a mass flow or flow rate, comprising a flow tube and excitation means for causing the flow tube to rotate about an axis of rotation, comprising at least three sensors arranged free of the flow tube for generating analog signals that correspond to the movement of the tube, and comprising means for digitizing the analog signals and for computing the mass flow from the digitized sensor signals.

A measuring system of such a type is known from EP 1 719 982 A1 and EP 1 719 983 A1. The measuring system described therein has three optical sensors a, b, and c arranged in line and associated with the tube for generating analog signals in three positions in correspondence with the movement of the tube, the positions of the sensors a and b in particular being symmetrical with respect to the axis of rotation, while the position of the sensor c is coaxial with those of the sensors a and b, at a greater distance from the axis of rotation than the positions of the sensors a and b, and farther removed from a than from b.

The Coriolis principle is based on the effect that a mass flow displacing in a rotating plane generates a force perpendicular to the direction of movement of the mass flow and the axis of rotation. For this purpose, a tubular shape is usually set in vibration at a natural frequency about an axis of rotation. The Coriolis force generates a movement about an axis of rotation that is perpendicular to the axis of the induced vibration. The ratio of the amplitudes of the induced rotation and the rotation generated by the Coriolis force is a linear function of the mass flow. Measuring the movement of the tube in a strategic location (i.e. where the deflection owing to the Coriolis force is a maximum) renders it possible to obtain an optimum determination of the ratio of the induced and the generated motion. The movement of the tube can be ascertained by a position measurement, a velocity measurement, or an acceleration measurement. The classical method of measuring the Coriolis effect in a Coriolis mass flowmeter is to measure the movement of the tube by means of two sensors around the axis of rotation of the excitation.

In general, the generated Coriolis forces are small, so that the ratio of the amplitudes of the induced and the generated forces will be small. Given these small ratios, therefore, the phase difference between two sensors is approximately equal to the ratio between the induced and generated displacements. The phase difference in that case is a measure for the mass flow of a medium through the tube. Small phase differences are a linear function of the mass flow here.

The positions of the sensors relative to the neutral position of the tube do not usually change in existing mass flowmeters of the Coriolis type because the tube is of a fixed shape or because the sensors are mechanically joined to the tube. The exact location of the sensors relative to the pole of rotation of the tube, however, determines the sensitivity of the instrument. If this location shows no drift, the exact sensitivity of the instrument can be determined once and for all through calibration. There will always be a small spread in sensitivity among individual instruments, owing to a spread in the locations of the sensors among other factors, and each instrument will have to be calibrated for obtaining a maximum accuracy.

Flow measuring instruments such as, for example, those described in EP 1 719 982 A1 and EP 1 719 983 A1, which have to be highly sensitive to the Coriolis effect in order to be able to measure low mass flows accurately, comprise a tube that is (flexibly) suspended such that it can be moved by very low forces while it is associated with contactless sensors. This has the disadvantage that the exact locations of the sensors relative to the axis of rotation of the tube are not constant. This axis of rotation may show a drift over time owing to temperature, pressure, or the forces of gravity. Since the sensors of the instrument are not connected to the tube, the sensitivity of the instrument will show a corresponding drift if two sensors are used.

The measured phase shift then is influenced not only by the mass flow, but also by the positions of the two sensors relative to the so-termed pole of rotation. This causes a drift in the sensitivity of the instrument and renders it less suitable for use as an accurate mass flowmeter.

The invention has for its object inter alia to provide a flowmeter of the Coriolis type that has a higher sensitivity and a higher accuracy in order to be able to measure low flow rates satisfactorily. According to the invention, the mass flowmeter of the kind mentioned in the opening paragraph is for this purpose characterized in that the means for computing the mass flow are arranged for using exclusively the time information from the sensor signals.

The flowmeter according to the invention uses sensors that measure the movement of the tube in a contactless manner, for example capacitively, or in particular optically. Optical sensors are capable of measuring the time information of the harmonic movement of the tube with a high degree of accuracy. If the amplitude of the sensors is also used, it is possible to compensate for the shift of the pole of rotation referred to above. The accurate information of two sensors on time and amplitude is sufficient in principle for determining the ratio between the movement of the excitation and that generated by Coriolis forces, given a slack tube form. Since the amplitude of the signals of the (optical) sensors used may be subject to drift owing to temperature and aging, this amplitude is not very well suited for use as supplementary information. According to the invention, therefore, the time information from a third sensor is used. This can compensate for the shift of the pole of rotation of the tube.

In an embodiment of the flow measuring system of the Coriolis type according to the invention, the first two sensors are located close together and symmetrically with respect to the axis of rotation of the tube. A third sensor is mounted immediately adjacent to one of the first two sensors. The exact ratio of the excitation and the generated displacement can be accurately determined from the accurate time information of the third sensor, irrespective of the exact location of the pole of rotation of the tube relative to the sensors. The accurate time information of all three sensors is used for accurately determining the ratio of amplitudes of the excitation and of the generation by Coriolis forces by means of algorithms in digital electronic circuits, even if the location of the pole of rotation should shift during normal operation. Since the ratio of the two amplitudes is a linear function of the mass flow, said mass flow can be determined through multiplication by a sensitivity factor.

Separate single-channel analog/digital (A/D) converters may be used, for example three in the case of three sensors, or multi-channel A/D converters, for example a three-channel A/D converter in the case of three sensors. It is alternatively possible, however, to use standard two-channel (stereo) A/D converters, i.e. pairs of A/D converters. Two pairs will be used in the case of three sensors.

To prevent the quality of the measuring data from deteriorating owing to internal phase rotation with the use of two pairs of A/D converters, the information from one sensor is read twice. If one sensor is read out twice, the result will be a total of four digital signals in the case of three sensors, the signal of one sensor being present in twofold. Pair 1 of the sensor signals comprises, for example, the information from sensors 1 and 2. Pair 2 of the sensor signals then comprises, for example, the information from sensors 1 and 3. This idea may be expanded to cover more than three sensors and more than two pairs of A/D converters.

An embodiment of the measuring system of the Coriolis type according to the invention in this respect is characterized by means for digitizing the analog signals and for generating digitized sensor signals, the signal of at least one of the sensors being read out twice.

A further embodiment is characterized in that it is the signal of one of the sensors that are symmetrically arranged relative to axis of rotation that is read out twice.

The invention also relates to a flowmeter comprising four or five [or more] sensors arranged in a row. An even more accurate determination of the position of the pole of rotation can be realized thereby through linearization.

The invention is also effective if three or more sensors are not arranged in a row, as long as their distances to the axis of rotation are different.

The invention further relates to a method of measuring a mass flow with the use of a flowmeter of the Coriolis type.

A few embodiments of the invention will be explained in more detail with reference to the drawings.

Figure 1:
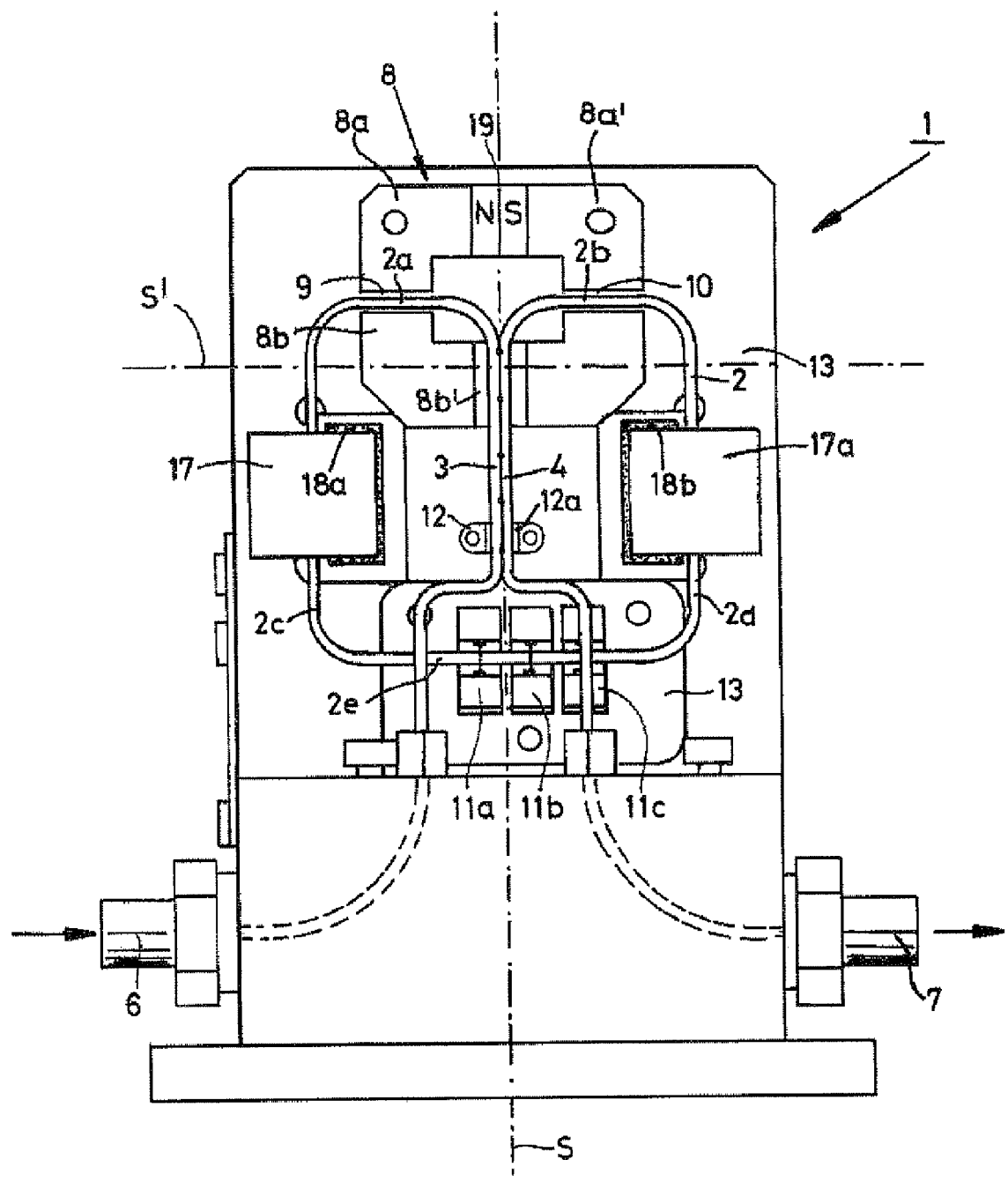
FIG. 1 shows a flowmeter of the Coriolis type with a Coriolis tube and three sensors.

FIG. 1 shows a special embodiment (although the invention is applicable to all types of Coriolis tubes) of a flowmeter 1 of the Coriolis type with a looped sensing tube 2 bent into a rectangular shape so as to form a substantially full (360°) turn. The looped sensing tube 2 comprises two mutually parallel lateral tube parts 2c, 2d that are connected at one side to a first transverse tube part 2e and at the other side to two second transverse tube parts 2a, 2b. The latter are connected to a (flexible) feed tube 3 and a (flexible) discharge tube 4 for a flowing medium at the side opposite to where they are connected to the lateral tubes 2c, 2d. The tube 2 forms a rectangle whose corners are rounded so as to make bending into this shape possible. The feed tube 3 is connected to a feed line 6 via a connection block 20, and the discharge tube 4 is similarly connected to a discharge line 7. The feed and discharge tubes 3, 4 in this embodiment extend within the loop 2 and are fastened to a frame 13 by fastening means 12. The flexible feed and discharge tubes 3, 4 do not form part of the rectangular loop shape of the sensing tube 2 but provide a flexible fastening of the loop 2 to the frame 13. The loop 2 may accordingly be regarded as being flexibly suspended by means of the feed and discharge tubes. A desired property in this respect is that the natural frequency of the tube part associated with the sensors should be substantially higher than that of the connection between this tube part and the frame such that no local natural modes occur. The measuring tube may be, for example, a stainless steel tube with an outer diameter of approximately 0.7 mm and a wall thickness of approximately 0.1 mm. Depending on the outer dimensions of the loop 2 and the pressure the tube is to be able to withstand (for example 100 bar), the outer diameter of the tube will in general be smaller than 1 mm and the wall thickness 0.2 mm or less.

The tubes 3 and 4 lie against one another on either side of and symmetrically with respect to the main axis of symmetry S (not shown) of the tube 2 and are fastened to the fastening means 12, for example by clamping, soldering or welding, said means 12 in their turn being fastened to the frame 13. An alternative is to fasten the tubes 3, 4 directly to the frame 13.

In the construction of FIG. 1, excitation means for causing the loop 2 to rotate about the main axis of symmetry (in this case the primary axis or excitation axis) comprise a magnetic yoke 8 that is fastened to the frame 13, that is provided with a permanent magnet 19, and that has two air gaps 9 and 10 through which portions 2a and 2b (denoted first transverse tubes above) of the looped tube 2 extend, as well as means for introducing an electric current into the tube 2. In FIG. 1 these are means for generating an electric current in the tube 2 through induction. The permanently magnetic magnet yoke 8 has two upper yoke parts 8a and 8a' that are separated from a lower yoke part 8b by the air gaps 9 and 10. The permanent magnet 19 is arranged with its one (North) pole facing the yoke part 8a and its other (South) pole facing the yoke part 8a'.

Current is induced in the tube by means of two transformer cores 17, 17a which are each provided with a respective electric coil 18a, 18b and through each of which a respective lateral tube part 2c, 2d is passed. The coils 18a, 18b may be wound on the inner sides of the transformer cores, as shown, or on one of the other sides. The combination of the mutually oppositely directed magnetic fields, generated in the gaps 9 and 10 of the permanently magnetic yoke 8 and transverse to the direction of the current on the one hand and an (AC) current induced in the tube 2 on the other hand exerts a torque on the tube owing to which the latter starts rotating (i.e. vibrating, in the so-termed twist mode) about the axis of rotation.

When a medium is flowing through the tube, the tube will start to oscillate about a response axis that is transverse to the axis of rotation (in the so-termed swing mode). In operation the (sinusoidal) displacements of points of the tube part 2e, which are representative of the flow, are detected by a Coriolis effect detection system which in this case comprises a first sensor 11a placed adjacent the tube part 2e and a second sensor 11b. The first and the second sensor are arranged directly against one another symmetrically with respect to the excitation axis of rotation S adjacent the point of intersection thereof with the tube part 2e. A third sensor 11c is placed in line with the first two directly against the outer side of one of them for the purpose of pole position correction. The sensors may be, for example, of an electromagnetic, inductive, capacitive, or ultrasonic type. In the embodiment of FIG. 1, however, optical sensors have been opted for. So-termed optoelectronic sensors 11a, 11b, and 11c are used as the optical sensors, each having a U-shaped housing that is fastened to the frame 13, with a light source (for example an LED) in one leg of the U and in the other leg a light-measuring cell (for example a phototransistor) arranged opposite the light source. The tube part 2e, or a vane fastened thereto, is capable of moving between the legs of the U-shaped sensor housings 11a, 11b (and 11c, if present), thereby intercepting more or less light from the light source.

Figure 2:
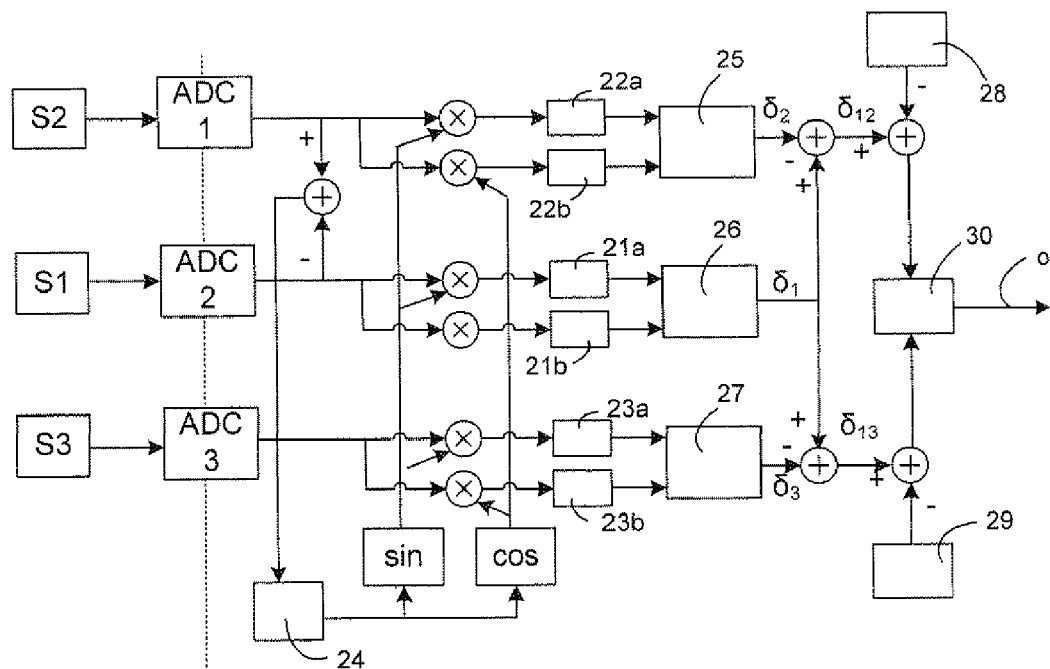
FIG. 2 is a first block diagram of the processing of the signals from the sensors of the flow measuring system of FIG. 1.

FIG. 2 is a block diagram showing the operation of an embodiment of the Coriolis flowmeter according to the invention. Three sensors S1, S2, S3 in a row are used for detecting the movement of the tube according to the block diagram of FIG. 2. All three sensors together form the detection system by means of which a sufficient amount of time information is gained so as to monitor the movement of the tube. The amplitude ratio between excitation and response is determined from these signals.

The working principle is as follows: the analog signals originating from the three sensors S1, S2, S3 are converted into digital signals by analog/digital (A/D) converters ADC 1, ADC 2, ADC 3. The difference in signals between the sensors S1 and S2 and the difference in signals between the sensors S1 and S3 are important for the invention. The information from the first two sensors is used indicatively for setting the tube into vibration at a natural frequency by means of an oscillator routine. The frequency and phase of this vibration are subsequently determined by means of a PLL (phase locked loop) 24. This is standard technology. A reference sine and cosine signal is then derived from the frequency and phase of the PLL 24. The reference sine is accordingly exactly in phase, the reference cosine out of phase by exactly 90° with respect to the signal coming from the PLL 24. The PLL signal has the exact frequency of the Coriolis tube, which vibrates at its natural frequency. Subsequently, the three digital signals from the sensors S1, S2, S3 are mixed with (i.e. multiplied by) the reference sine and cosine of the PLL 24. For each signal the component is thus determined that is in phase and out of phase with the PLL phase. Filtering of each of these signals separately (in parallel) through a low pass filter 21a,b; 22a,b; 23a,b yields DC components for each sensor. Six signals are accordingly available at this moment. The phase of each digital sensor signal relative to the PLL phase is now determined in the blocks 25, 26, 27 in that the arctangent is determined for each pair of signals. This yields three relative phase angles with respect to the phase of the PLL, i.e. $\delta_1$, $\delta_2$ and $\delta_3$. The reference phase of the PLL is eliminated in that the independent phase angles are compared with one another. This means that the difference is computed between the phases of sensors 1 and 2. Then the difference is computed between the phases of sensors 1 and 3. All this leads to two independent phase angles, i.e. the phase angle between the sensors 1 and 2 according to $\delta_2-\delta_1=\delta_{12}$ and the phase angle between the sensors 1 and 3 according to $\delta_3-\delta_1=\delta_{13}$. These independent phase angles supply the necessary, indeed sufficient information in order to be able to compensate for the shift in the pole of rotation of the tube.

Figure 3:
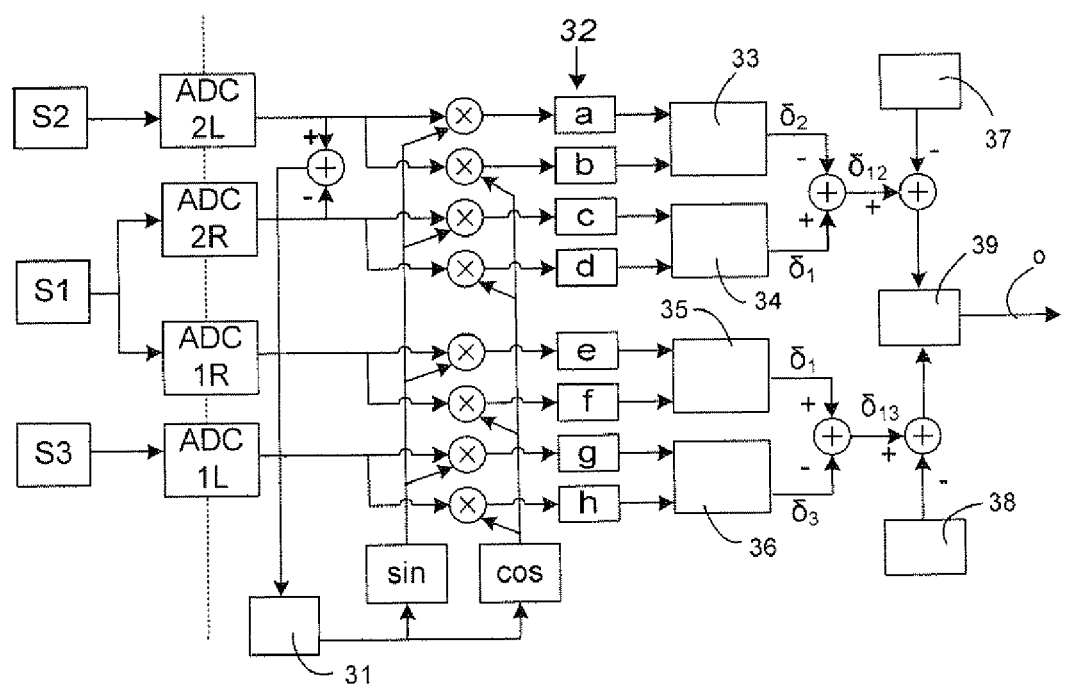
FIG. 3 is a second block diagram of the processing of the signals from the sensors of the flow measuring system of FIG. 1.

A modified version will now be discussed with reference to the block diagram shown in FIG. 3.

The analog signals coming from the three optical sensors S1, S2, S3 are converted by analog/digital (A/D) converters into digital signals. This is done in this case by a standard component in which is present a double stereo A/D converter ADC 1L/ADC 1R; ADC 2L,/ADC 2R, by means of which a total of four channels can be read out. The difference in signals between the sensors S1 and S2 and the difference in signals between the sensors S1 and S3 are to be determined. To prevent the quality of the measuring data from deteriorating owing to internal phase rotation in the A/D converter, the information from one sensor, in this case sensor S1, is read out twice, once for each pair of A/D converters. This accordingly leads to four digital signals of which here the signal from sensor S1 is present in twofold. Pair 1 of the sensor signals comprises the information from the sensors S1 and S2. Pair 2 of the sensor signals comprises the information from the sensors S1 and S3.

Alternatively, the signal from sensor S2 or from sensor S3 may be read out in twofold instead of the signal from sensor S1.

The information from the first two sensors is used indicatively for setting the tube into vibration at a natural frequency by means of an oscillator routine. The frequency and phase of this vibration are subsequently determined by means of a PLL (phase locked loop) 31. This is standard technology. A reference sine and cosine signal is then derived from the frequency and phase of the PLL 31. The reference sine is accordingly exactly in phase, the reference cosine out of phase by exactly 90° with respect to the signal coming from the PLL 31. The PLL signal has the exact frequency of the Coriolis tube, which vibrates at its natural frequency. Subsequently, the four digital signals from the sensors are mixed with (i.e. multiplied by) the reference sine and cosine of the PLL 31. For each signal the component is thus determined that is in phase and out of phase with the PLL phase. Filtering of each of these signals separately (in parallel) through a low pass filter 32a-h yields DC components for each sensor. Eight DC signals are accordingly available at this moment. The phase of each digital sensor signal relative to the PLL phase is determined in that in blocks 33 to 36 the arctangent is determined of each pair of signals. This yields four relative phase angles with respect to the PLL phase, i.e. $\delta_{1a}$, $\delta_2$, $\delta_{1b}$, $\delta_3$. Comparing the independent phase angles with one another eliminates the reference phase of the PLL. This implies that the difference is computed between the phases of the sensors S1 and S2. Then the difference is computed between the phases of the sensors S1 and S3. This yields two independent phase angles, i.e. the phase angle between the sensors S1 and S2 according to $\delta_2-\delta_{1a}=\delta_{12}$ and the phase angle between the sensors S1 and S3 according to $\delta_3-\delta_{1b}=\delta_{13}$. These independent phase angles supply the necessary, indeed sufficient information in order to be able to compensate for the shift in the pole of rotation of the tube.

The principle of compensating for the shift of the pole of rotation on the basis of two independent phase angles $\delta_{12}$ and $\delta_{13}$ operates as follows: first zero point errors in the phase measurement are compensated. This is done in that the two phase angles are measured during zero flow. It is safeguarded by means of shut-off valves that there is no flow through the instrument during this. Then the measured signals are stored in a memory. The stored values for zero flow are subsequently subtracted from the measured phase angles during flow measurements. This is a standard technique for compensating for zero point deviations, also denoted zero or offset compensation. Phase deviations caused by mechanical and electrical imperfections are compensated for in this manner.

In the case of three sensors, the fact is utilized that the sensors do not change their relative positions. The two measured independent phase angles are usually acute angles in the case of low flow values. The difference between these phase angles and an angle of π radians gives the obtuse alternative values for these two low-flow phase angles. The obtuse values of the two measured phase angles are denoted θ1 en θ2. An angle φ is derived from θ1 en θ2 as follows:

$$\varphi = \arctan\left(\frac{\sin(\theta_2)\cdot\sin(\theta_1)}{[\sin(\theta_2)\cdot\cos(\theta_1)]-[2\cdot\sin(\theta_1)\cdot\cos(\theta_2)]}\right)$$

An opposite angle γ is derived from this angle φ:

$$\gamma=\pi-\varphi-\theta_1$$

Then an angle α is computed from the angles φ and γ thus obtained:

$$\alpha = \arctan\left(\frac{2\cdot\tan(\varphi)\cdot\tan(\gamma)}{\tan(\varphi)+\tan(\gamma)}\right)$$

From this angle α, which is equal to the phase between the excitation amplitude and the amplitude generated by the Coriolis force, follows the ratio between the excitation amplitude and the amplitude generated by the Coriolis force. This ratio is proportional to the mass flow $\phi_m$ as represented below:

$$\phi_m \propto 2 \cdot \tan(\alpha)$$

Summarizing, the invention relates to a flow measuring system of the Coriolis type for measuring a mass flow, with a flow tube and with excitation means for causing the flow tube to rotate about an axis of rotation, with at least three sensors arranged free of the flow tube for generating analog signals that correspond to the movement of the tube, and with means for digitizing the analog signals and for computing the mass flow from the digitized sensor signals, wherein the computation means are arranged for using exclusively the time information from the sensor signals. The accurate time information of the sensors is used by algorithms in digital electronic circuits for accurately determining the ratio between amplitudes owing to excitation and those owing to Coriolis forces. The mass flow is derived from this ratio.

The invention claimed is:

1. A measuring system of the Coriolis type for measuring a mass flow, comprising a flow tube and excitation means for causing the flow tube to rotate about an axis of rotation, comprising at least three sensors arranged free of the flow tube for generating analog signals that correspond to the movement of the tube, and comprising means for digitizing the analog signals and means for computing the mass flow from the digitized sensor signals arranged for using exclusively the time information from the sensor signals, and further comprising means for deriving the ratio between the amplitudes due to excitation and those due to generation by Coriolis forces from the time information and for computing the mass flow from this ratio.

2. A measuring system of the Coriolis type as claimed in claim 1, characterized by sensors S1, S2 and S3 associated with the flow tube for generating analog signals in three positions in dependence on the movement of the tube, wherein the positions of the sensors S1 and S2 are symmetrical with respect to the axis of rotation, whereas the position of the sensor S3 is coaxial with those of the sensors S1 and S2, is at a greater distance to the axis of rotation than the positions of the sensors S1 and S2, and is farther removed from S2 than from S1.

3. A measuring system of the Coriolis type as claimed in claim 2, characterized by means for generating sine and cosine signals having the same frequency, means for multiplying the digitized signals each by the sine and cosine signals followed by low pass filters for providing the DC components of the product signals, means for computing the phase relative to a reference phase from the ratio of the two DC components of each incoming signal, means for computing the phase difference between the signals of the sensors S1 and S2, means for computing the phase difference between the signals of the sensors S1 and S3, and means for computing the mass flow from said phase differences.

4. A measuring system of the Coriolis type as claimed in claim 1, characterized by means for digitizing the analog signals and for generating digitized sensor signals, the signal of at least one of the sensors being read out twice.

5. A measuring system of the Coriolis type as claimed in claim 4, characterized in that it is the signal of one of the sensors that are symmetrically arranged relative to axis of rotation that is read out twice.

6. A method of measuring a mass flow by means of a measuring system of the Coriolis type, with a flow tube and at least three sensors associated therewith for generating analog signals in dependence on the movement of the tube, which method comprises the following steps:

exciting the flow tube in a primary mode so as to cause it to oscillate about an axis of rotation, digitizing the analog sensor signals, computing the mass flow from the digitized sensor signals, wherein exclusively the time information from the sensor signals is used for computing the mass flow, and deriving a ratio between amplitudes due to excitation and those due to generation by Coriolis forces from the time information and for computing the mass flow from this ratio.

7. A method of measuring a mass flow as claimed in claim 6, characterized in that the time information from all sensors is used by means of algorithms in electronic circuits for determining the ratio between the amplitudes due to excitation and those due to generation by Coriolis forces.

8. A measuring system of the Coriolis type as claimed in claim 1, characterized by sensors S1, S2 and S3 associated with the flow tube for generating analog signals in three positions in dependence on the movement of the tube, wherein the positions of the sensors S1 and S2 are symmetrical with respect to the axis of rotation, whereas the position of the sensor S3 is coaxial with those of the sensors S1 and S2, is at a greater distance to the axis of rotation than the positions of the sensors S1 and S2, and is farther removed from S2 than from S1.

9. A measuring system of the Coriolis type as claimed in claim 8, characterized by means for generating sine and cosine signals having the same frequency, means for multiplying the digitized signals each by the sine and cosine signals followed by low pass filters for providing the DC components of the product signals, means for computing the phase relative to a reference phase from the ratio of the two DC components of each incoming signal, means for computing the phase difference between the signals of the sensors S1 and S2, means for computing the phase difference between the signals of the sensors S1 and S3, and means for computing the mass flow from said phase differences.

10. A measuring system of the Coriolis type as claimed in claim 1, characterized by means for digitizing the analog signals and for generating digitized sensor signals, the signal of at least one of the sensors being read out twice.

11. A measuring system of the Coriolis type as claimed in claim 2, characterized by means for digitizing the analog signals and for generating digitized sensor signals, the signal of at least one of the sensors being read out twice.

12. A measuring system of the Coriolis type as claimed in claim 8, characterized by means for digitizing the analog signals and for generating digitized sensor signals, the signal of at least one of the sensors being read out twice.

* * * * *